United States Patent
Menhusen et al.

(10) Patent No.: US 11,392,495 B2
(45) Date of Patent: Jul. 19, 2022

(54) FLAT CACHE SIMULATION

(71) Applicant: Hewlett Packard Enterprise Development LP, Houston, TX (US)

(72) Inventors: Ryan D. Menhusen, Fort Collins, CO (US); Todd Austin Carrington, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 397 days.

(21) Appl. No.: 16/271,001

(22) Filed: Feb. 8, 2019

(65) Prior Publication Data

US 2020/0257622 A1 Aug. 13, 2020

(51) Int. Cl.
- G06F 12/00 (2006.01)
- G06F 12/0802 (2016.01)
- G06F 16/903 (2019.01)
- G06F 30/20 (2020.01)

(52) U.S. Cl.
CPC .... G06F 12/0802 (2013.01); G06F 16/90335 (2019.01); G06F 30/20 (2020.01); *G06F 2212/60* (2013.01)

(58) Field of Classification Search
None
See application file for complete search history.

(56) References Cited

U.S. PATENT DOCUMENTS

| | | | |
|---|---|---|---|
| 2012/0233410 A1 | 9/2012 | Fu et al. | |
| 2013/0173887 A1* | 7/2013 | Kenney | G06F 9/3004 |
| | | | 712/218 |
| 2015/0039940 A1* | 2/2015 | Loewenstein | G06F 11/26 |
| | | | 714/37 |
| 2016/0110209 A1 | 4/2016 | Lee | |
| 2017/0091104 A1* | 3/2017 | Rafacz | G06F 12/0862 |

FOREIGN PATENT DOCUMENTS

| | | | | |
|---|---|---|---|---|
| CN | 102591759 A | | 7/2012 | |
| CN | 103136032 A | | 6/2013 | |
| CN | 106980577 A | * | 7/2017 | ......... G06F 12/0246 |

OTHER PUBLICATIONS

Gem5, "The gem5 Simulator", Feb. 5, 2018, available online at <https://web.archive.org/web/20190205174821/http://gem5.org/Main_Page>, 3 pages.

(Continued)

*Primary Examiner* — Midys Rojas
(74) *Attorney, Agent, or Firm* — Sheppard Mullin Richters Hampton LLP

(57) ABSTRACT

Systems and methods are provided for accurately simulating memory operations of a multi-compute-engine system, such as a multi-core system. Simulation speed can be increased by consolidation location and state information associated with data stored in one or more caches of a simulated cache hierarchy. This consolidation of information can be reflected in a single cache line map or flat cache. Accordingly, searches for data (and copies of the data) in each and every cache of the simulated cache hierarchy can be performed fast and with greater efficiency than conventional simulation systems that operate using sequential, cache-by-cache searching, while maintaining data coherency.

20 Claims, 7 Drawing Sheets

(56) References Cited

OTHER PUBLICATIONS

Kun Wang et al., "Parallelization of IBM Mambo System Simulator in Functional Modes", vol. 42 (1), Jan. 2008, pp. 71-76.
SST, "The Structural Simulation Toolkit", Introduction to SST, Nov. 28, 2018, available online at <https://web.archive.org/web/20181128230910/http://sst-simulator.org/>, 3 pages.
Yaosheng Fu and David Wentzlaff, "PriMe: A Parallel and Distributed Simulator for Thousand-Core Chips," Mar. 2014, pp. 1-10, IEEE.

* cited by examiner

FLAT CACHE SIMULATION

DESCRIPTION OF RELATED ART

The advent of technology has led to an exponential growth in the computational power of computing systems. Use of multi-processor devices and multi-core processors (which include a number of cores or processor) in computing systems, has also contributed to the increase in computational power of computing systems. Each of the cores or processors may include an independent cache memory. The integrity of data stored in each cache of the cores or processors can be referred to as cache coherence.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
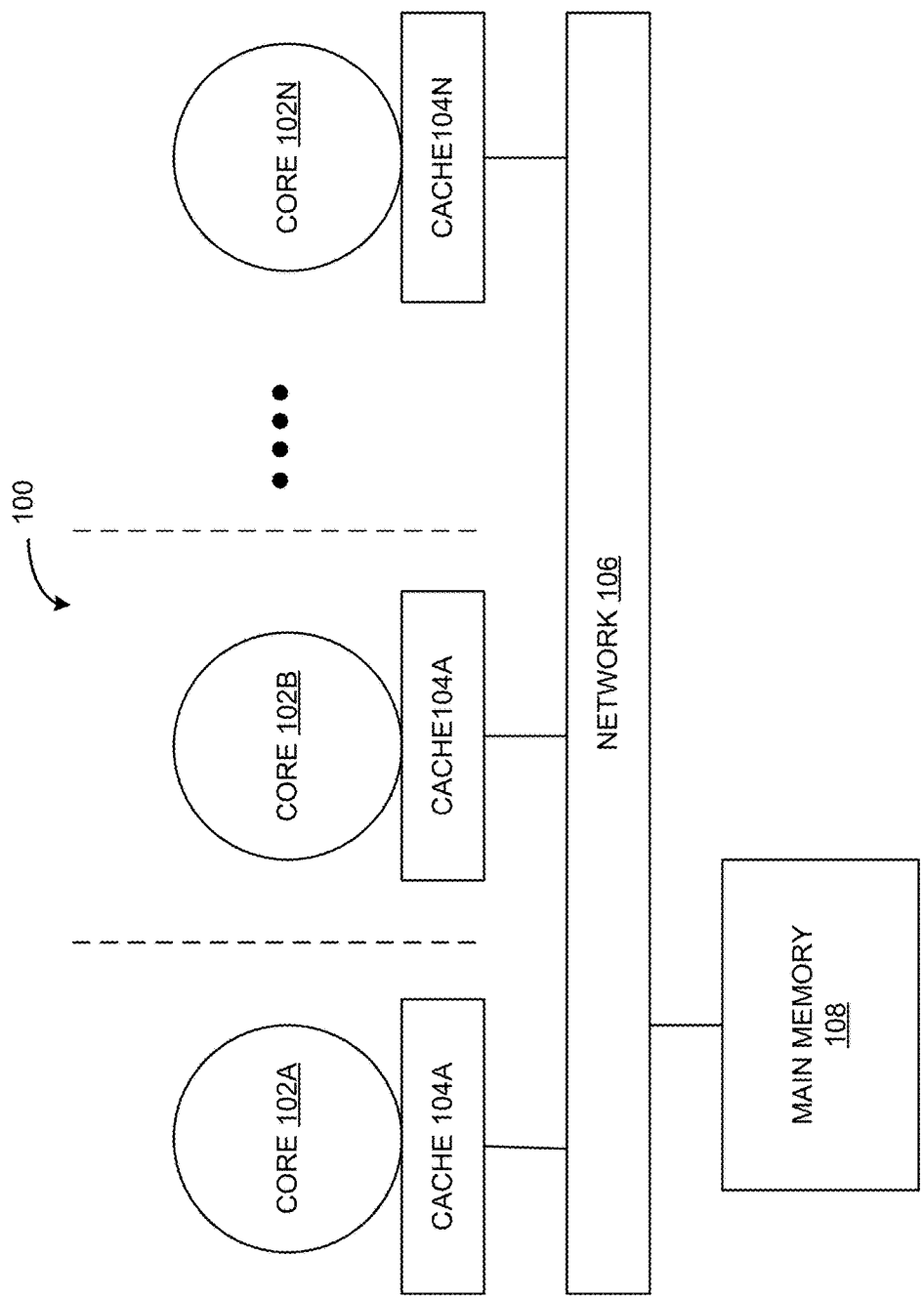
FIG. 1 illustrates an example one-to-many-core processing system architecture.

The figures are not exhaustive and do not limit the present disclosure to the precise form disclosed.

DETAILED DESCRIPTION

Generally, a memory of a computing system includes a main memory, such as a non-volatile memory (NVM), and a cache memory (or simply, cache). The main memory can be a physical device that is used to store application programs or data in the computing system. The cache stores frequently accessed data so that time need not be spent accessing the data from the main memory. Typically, data is transferred between the main memory and the cache in blocks of fixed size, referred to as cache lines. When a processor of the computing system has to read from or write to a location in the main memory, the processor reads from or writes to the cache if the data is already present in the cache, which is much faster than reading from or writing to the main memory. Data that is written to the cache, is generally written back to the main memory.

In a multi-compute-engine system, each compute engine, such as a core or a processor, includes one or more caches, and generally, a cache is organized as a hierarchy of one or more cache levels. Users or customers who purchase large multi-core processing systems (also referred to as exascale systems, which can scale to enough nodes to execute, e.g., a billion-billion calculations per second), often conduct simulations of such proposed, multi-core processing systems to judge performance when they select vendors. However, simulating a complex memory-centric system at a high level of detail can be difficult because simulating the memory hierarchy of a multi-core processing system can greatly increase the time needed to conduct a simulation.

For example, when accessing data vis-à-vis hardware caches, associative parallel comparisons can be performed when searching for a correct cache line storing the data. These comparisons are performed in parallel for speed. However, simulators that rely on software-based comparisons, execute cache line comparisons sequentially, rather than in parallel. This adds to processing complexity and results in long latency.

In accordance with various embodiments, a single cache line map is created for use in/with, e.g., a multi-core cache simulation model to avoid the complexity/latency associated with conventional, sequential-based searching. This cache line map can be stored in a hash table indexed as a function of cache line addresses. The cache line map may contain address information of where data is located (cores and cache levels). That is, a cache model that "collects" location information associated with data stored in caches (at whatever level and/or core) is generated so that simulation operations need only access the cache line map to determine where data resides in the multiple cache levels/cores of the simulation model. The cache line object in a cache line map can be used to access corresponding data/update location information. In this way, a simulator no longer needs to sequentially search through and compare data in or at every cache level. For example, the cache line map can be accessed to determine the location of data. If the data is not present in the cache line map, the data can simply be retrieved from main memory. For example, if the state(s) of a cache line(s) changes, data comparisons can be made, again, just by referring to the cache line map. In order to maintain coherency, a coherency protocol, such as the Modified, Exclusive, Shared, Invalid (MESI) protocol (also referred to as the Illinois protocol), can be leveraged. For example, such a coherency protocol manages conflicts and maintains consistency between the cache(s) and the main memory by requiring cache-to-cache transfer on a miss if a cache line resides in another cache.

Considering an example of a multi-core processing system, each processor may include several cores, each core having its own levels of cache. Multiple copies of the same data from a main memory may be cached concurrently within several or all of these cores/cache levels. To maintain a consistent view of the main memory by all the cores, all such copies should have a mechanism to keep the view of data consistent.

For example, consider a first core and a second core of a multi-core processing system that are to cache a copy of data (D) in their respective caches simultaneously. A cache coherence problem may arise when the first core modifies its copy of data (D), while the second core simultaneously uses its copy of data (D). Once the first core modifies its copy of data (D'), the copy of data (D), held in the cache of the second core is no longer valid. In such a situation, if the second core were to read data (D) from its cache, a wrong value of data (D) would be returned. As alluded to above, a cache coherence protocol, such as the MESI protocol enables managing such conflicts and maintaining consistency between the cache(s) and the main memory.

FIG. 1 illustrates an example architecture of a multi-compute-engine processing system 100. In one example, the multi-compute-engine processing system 100 may be operable on a directory-based protocol to achieve cache coherence. The multi-compute-engine processing system 100 may be, for example, a multi-processor system, one-to-many core system, or a multi-core processor system. Accordingly, the multi-compute-engine system 100 may comprise multiple processors or cores, based on the configuration of the multi-compute-engine system 100. In the illustrated example of FIG. 1, the multi-compute-engine system 100 may include multiple cores 102A, 102B, . . . 102N.

Each of the cores 102A, 102B, . . . 102N, may have one or more cache levels 104A, 1046 . . . 104N associated with them, respectively. A network 106 allows cores 102A, 102B . . . 102N to communicate with each other as well as with a main memory 108 of the multi-compute-engine system 100. Data of main memory 108 may be cached by any core of multi-compute-engine system 100, for example, any of cores 102A, 102B . . . 102N.

Figure 2:
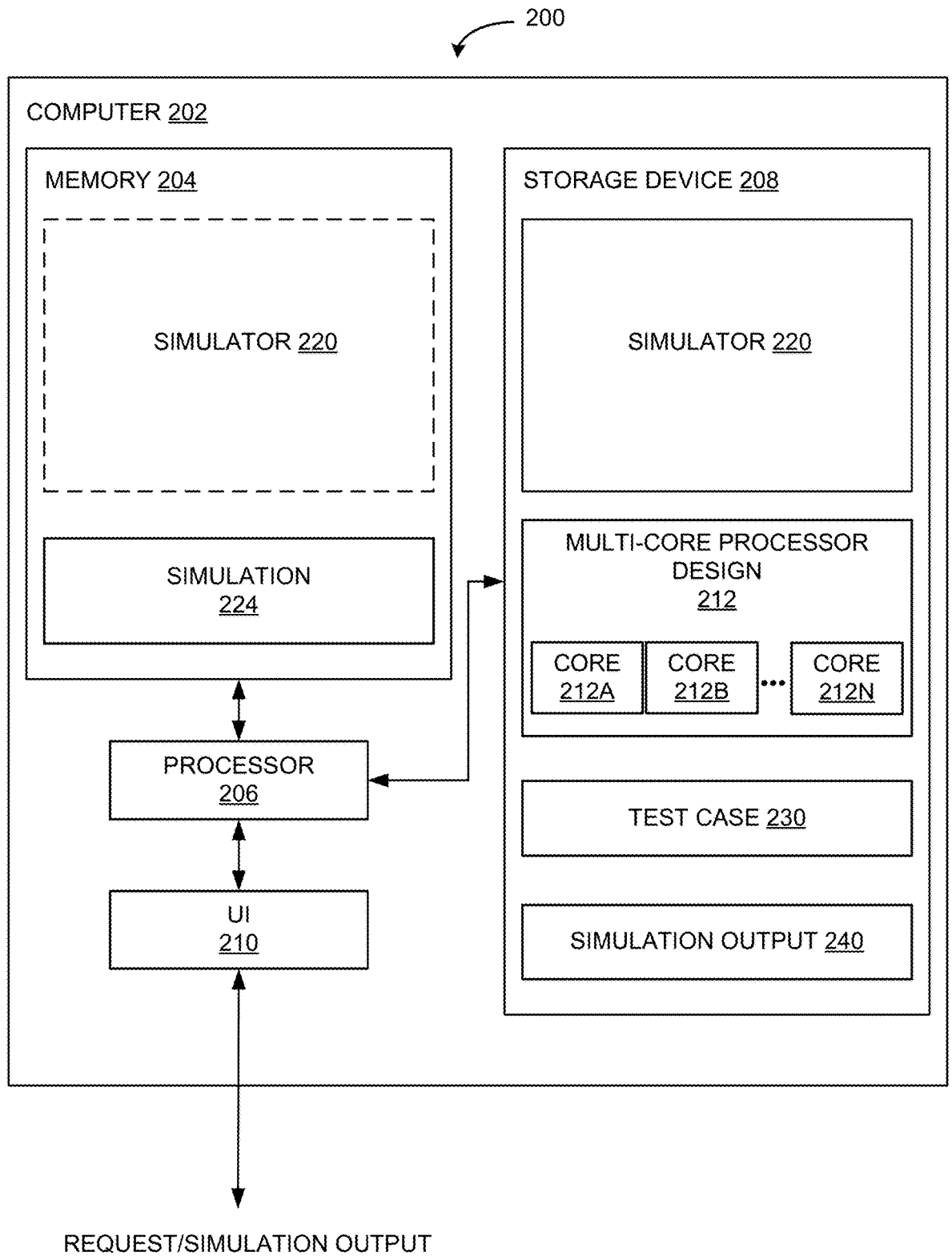
FIG. 2 illustrates an example system in which a simulator configured in accordance with various embodiments may be implemented.

FIG. 2 illustrates an example simulation system 200 in which a simulator can be implemented and used to simulate data lookup/access of a simulated multi-core processor system. Simulation system 200 may include a computer 202, which in turn, may have a memory 204, a processor 206, a storage device 208, and a user interface 210. It should be understood that more or less components/elements may exist as part of simulation system 200 and computer 202 in accordance with other embodiments. For example, simulation system 200 may optionally include an interactive device (not shown) operatively connected to user interface 210. Such an interactive device may be, for example, a computer terminal used by a verification engineer to interact with computer 102. Otherwise, as illustrated, a user may interact with computer 202 directly vis-à-vis user interface 210. Storage device 208 may be, for example, a disk drive or other storage device that stores software and data of computer 202.

As illustrated, storage device 208 may have stored therein, a simulator 220, a multi-core processor design 212, a test case 230, and some form of a simulation output 240 that can be produced or generated for a user. Simulator 220 may comprise one or more software-implemented algorithms or instructions for effectuating simulations on multi-core processor deign 212, as will be described below. In operation, a user, such as the aforementioned verification engineer, can enter a request, via user interface 210, to instruct processor 206 to load simulator 120 into computer memory 204, for execution therein. Simulator 220 is therefore indicated using dashed lines within computer memory 204, for purposes of illustration.

In the example illustrated in FIG. 2, multi-core processor design 212 may have two or more processing cores 212A, 212B, . . . 212N. Additional cores may be included in processor design 212 as a matter of design choice. In the illustrated example, storage device 208 is shown with one test case 230 according to which a simulation may be performed, although additional test cases may be included in storage device 208, also as a matter of design choice. Test case 230 may comprise instructions executed by processor 206 for simulating operations performed on/with multi-core processor design 212. For example, test case 230 may involve a user logging in and attempting to program the simulated hardware (multi-core processor design 212) in certain ways, and then attempting to use the simulated hardware as intended. As another example, test case 230 may involve using software interfaces that are tied to the simulated hardware. Additionally still, it may be used for actual firmware/software development where a host system may be unsuitable for a final product (e.g., a host system is x86 without the necessary hardware components, while the simulated system is ARMv8 with new hardware components).

In operation, simulator 220 may create a simulation 224 for multi-core processor design 214 in memory 204. Simulator 220 may load all or part of multi-core processor design 214 into simulation 224. Simulator 220 may then simulate operation of multi-core processor design 214, using, e.g., simulation data, event stimuli, and/or test instructions of test case 230 to produce simulation output 140. The simulation output 140 can be sent, displayed, or otherwise represented to a user via user interface 210. As will be described in greater detail below, simulation 224 may be performed based on a cache line model representative of a multi-core processing system cache hierarchy using a single cache line map to determine cache line location. Accordingly, multi-core processor design 212 can be reflected, at least in part by the aforementioned cache line model and cache line map.

As alluded to above, in one example, software-based simulations can rely on sequential cache line comparisons. In doing do, the conventional assumption is made that all data is coherent in a multi-core system, and the cache is not modeled (generally to maintain speed when running simulations). However, this assumption may not result in an accurate simulation of a multi-core processor system, and removes any possibility for non-coherency/coherency-related operations to be simulated. Accordingly, various embodiments implement the cache line map, e.g., a single cache line map, which properly reflects the location of data across all cores and all cache levels of a simulated multi-core processor system. It should be noted that software-based simulations in accordance with other embodiments may be conducted in the context of a pure cache environment, e.g., one in which different cache policies (e.g., MESI) can be tested and compared.

Figure 3:
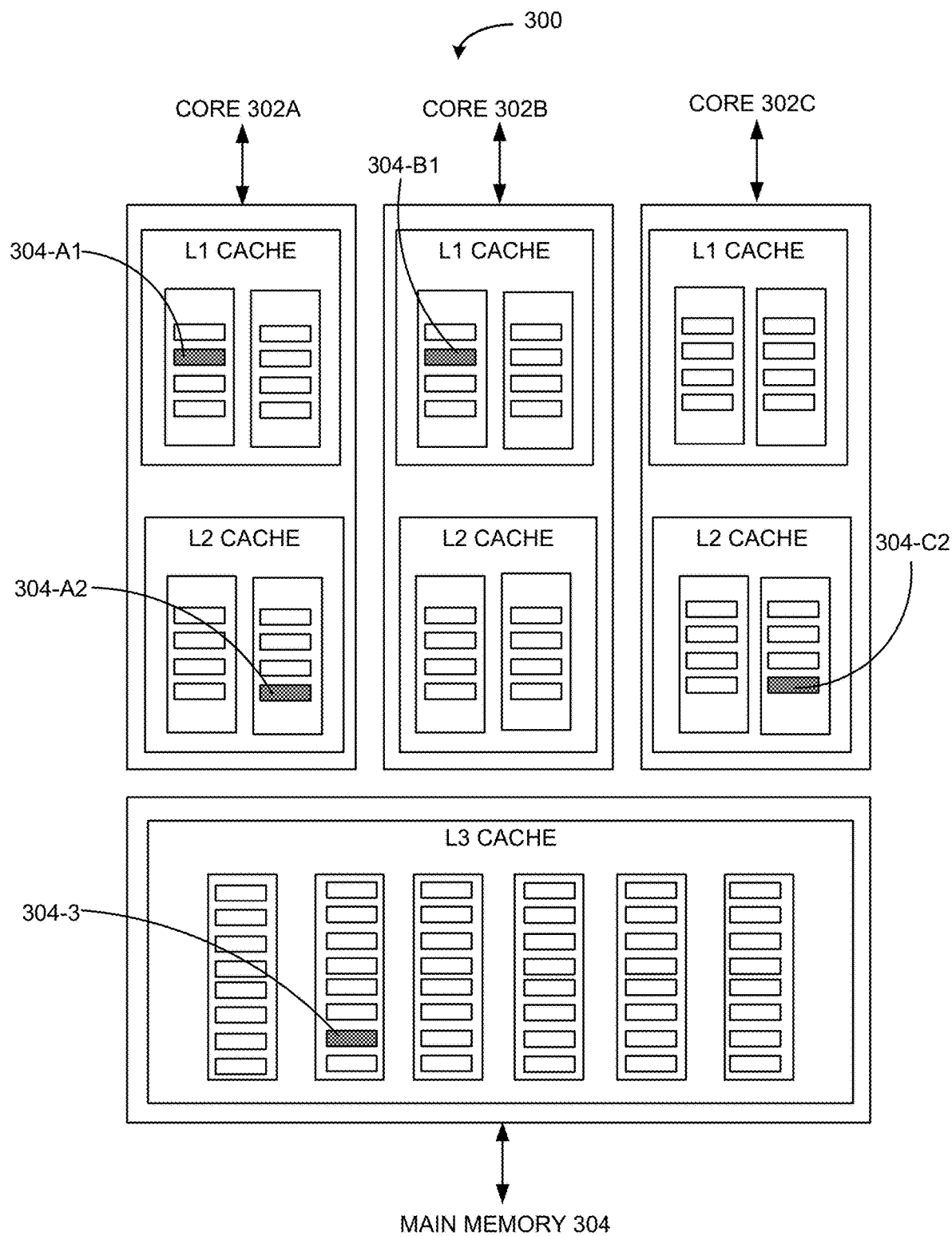
FIG. 3 illustrates an example hardware cache model layout of a simulated multi-core processing system.

FIG. 3 illustrates an example hardware cache model 300 replicating or representative of the cache hierarchy of a multi-core processor system, such as that illustrated in FIG. 1, whose operation is to be simulated by system 200 of FIG. 2. Regarding cache coherency, data values can be changed by a processor or compute engine, and these changes may progress sequentially through the cache hierarchy (in this example, the L1 cache to the L2 cache to the L3 cache), and on to main memory. When reading, multiple cache levels may store a value. If that value is changed at a particular core or cache level, the corresponding cache line's state should be updated across all cores/cache levels so when that value is read (anywhere), it is the updated value that is read. It should be understood that the value may not necessarily be replicated for current entries, where current entries in other caches/cache levels that are not modified can be invalidated until later-referenced by the core.

Moreover, FIG. 3 represents a particular cache line 304 (or block, e.g., a contiguous set of bits/bytes that forms some unit of data) which can be thought of as symbolizing the same data (having some value) being represented in multiple areas of different cores, different caches, and/or different cache levels. For example, the hardware cache model 300 may reflect cache line 304 being stored in the L1 and L2 caches of a core 302A (represented, respectively as 304-A1 and 304-A2), the L1 cache of core 302B (represented as 304-B1), the L2 cache of a core 302C (represented as 304-C2), and in a shared L3 cache (represented as 304-3). It should be understood this simulated cache hierarchy reflects the situation where different copies of the same cache line (304) may be stored in different locations, which as noted above, can result in incoherency between the different copies.

The different cache levels, (L1, L2, and L3) can refer to the "closeness" of a cache to a processor core as well as its accessibility. In this example, the L1 cache of each of cores 302A, 302B, and 302C may be a primary cache that is fast, but relatively small in capacity. It should be noted that in some embodiments, the two L1 caches may represent "data" and "instructions" that the L1 cache caches for a core. The L2 cache of each of cores 302A, 302B, and 302C may be a secondary cache with greater capacity than that of the respective L1 caches. It should be noted that the L2 cache can be shared between different L1 cache sections. As noted above, the L3 cache may be a cache shared between cores, whereas the respective L1 and L2 caches of cores 302A, 302B, and 302C are dedicated caches.

Considering cache line 304, the data symbolized by cache line 304 may be read, for example, and stored in the shared L3 cache (represented as 304-3). Cache line 304 may then be replicated at each cache level of each core that may wish to access that data. For example, core 302A may read a memory location associated with cache line 304. The data symbolized by cache line 304 may be pulled into/stored in the L1 and L2 caches of core 302A (represented as 304-A1 and 304-A2, respectively), as well as the shared L3 cache. Given that the L1 and L2 caches may differ in size, different policies regarding how long each respective copy of cache line 304 is stored in each cache may differ. It can be appreciated that regarding core 302B, cache line 304 is no longer present in its L2 cache, the L2 cache of core 302B having the freedom to eject cache line 304 to create space for other cache lines. However, cache line 304 may remain in the L1 cache of core 302B (represented as 304B-1) because cache line 304 may still be relevant at that cache level for core 302B. With respect to core 302C, cache line 304 may no longer be stored in the L1 cache, yet it may remain in the L2 cache (represented as 304C-2). If for some reason, core 302C needs cache line 304 again, it can be accessed/pulled from the L2 cache of core 302C. One of the cores, e.g., core 302A, may write the data to a different value. To maintain coherency, each of the caches storing cache line 304 ejects/flushes cache line 304 or stores the updated (different) value.

In hardware or a hardware cache model, the data symbolized by cache line 304 must exist and be organized separately, because again, the L1, L2, and L3 caches are physically different/separate (and modeled as such). Moreover, in hardware or this hardware cache model, cache lines can be organized in sets and ways to allow for fast access to the cache lines according to memory addresses. For example, in a typical L1 cache, a set (indexed according to a memory address) containing, e.g., four cache lines (four-way associative cache). Each of these four cache lines must be accessed (in parallel) to determine if a match exists (perform a comparison). Moreover, multiple cache levels can be searched in parallel (again for speed).

In simulations, parallel processing involves too much overhead, forcing simulations to search sequentially to perform comparisons. Moreover, as core count increases, processing slows down further. This is because if core 302B, for example, wishes to write to a particular cache line in its L2 cache (where that cache line is also be held by other cores/other cache levels), core 302B must instruct every other relevant core to remove it from their respective caches (because their current copies are now invalid). This is conventionally performed core-by-core and cache level-by-cache level, and each cache must be searched to determine if that particular cache line is even present so that it may be evicted/flushed. Only after this is completed can the data value of the cache line be updated.

To avoid the increased latency associated with searching caches in conventional simulations, while still being able to simulate a hardware cache hierarchy, a single cache line map can be created, where that cache line map is representative of the entire hardware cache hierarchy. In this way, cache line lookups (and comparisons) can be performed sequentially during a simulation, but still mimic (or at least approach mimicking) the parallelism that can be achieved with actual hardware. That is, the hierarchy of cores, caches, and cache levels can be flattened or compressed into a single map or layer from which the presence and location (or absence) of a cache line can be determined with a single lookup. This single lookup determination by a simulator (e.g., simulator 200 of FIG. 2) produces the same (or similar) result as multiple, parallel lookups performed in hardware, but without the processing power/complexity associated with parallel processing. Generally, a single cache line map is generated to represent a cache hierarchy across cores, where cache line objects contained in the single cache line map represents cache lines in the cache hierarchy. It should be noted that in some embodiments, multiple cache line maps may be generated and used to either distribute the load of memory addresses, or even split cores between map, which would incur a second lookup, yet still achieve efficiency increases over conventional simulations.

Accordingly, the order of magnitude in terms of processing complexity can be reduced from, e.g., $O(n)$ or linear complexity (representing the core-by-core, cache-by-cache, cache level-by-cache level lookup) down to $0(1)$ or constant complexity (representing the single lookup). Even in a single-core simulation, improvements can be realized by the use of a single cache line map as disclosed herein, and when the number of cores/caches/cache levels increase, the cache maintenance time increases only minimally. Accordingly, although embodiments herein are described in the context of multi-compute-engine systems, application of cache line maps as disclosed herein are contemplated for use in single-core systems.

For example, testing shows that the time needed to simulate a single-core Linux system bootup process can be, e.g., 15 minutes, when performing a conventional simulation. However, performing that same simulation in accordance with various embodiments reduces the simulated bootup process time to approximately 12 minutes. When the simulated Linux system increases from one core to two cores, conventional, simulated bootup can take, e.g., 30 minutes, whereas simulated bootup in accordance with various embodiments only increases by approximately 3 minutes (15 minutes total). The disparity becomes even greater when the Linux system is operating with four cores, where conventional simulated bootup can take up to, e.g., 45 minutes, while simulated bootup in accordance with various embodiments increases by a minute (or less), for example. When considering exascale systems that can include hundreds of thousands of computing nodes (processors) characterized generally as being able to perform at least 1 exaFLOP, or one billion billion (quintillion) floating point calculations per second, the difference between conventional simulators and those embodiments described herein becomes even greater.

It should be understood that multiple simulators can be run in parallel with respect to different computing nodes (where computing nodes and their sockets and cores) are interconnected via, e.g., a fiberoptic fabric. However, to perform simulations with respect to a single coherency domain (i.e., within a single socket and its associated local memory), the resulting overhead required for parallel processing is too costly to perform in software.

Figure 4A:
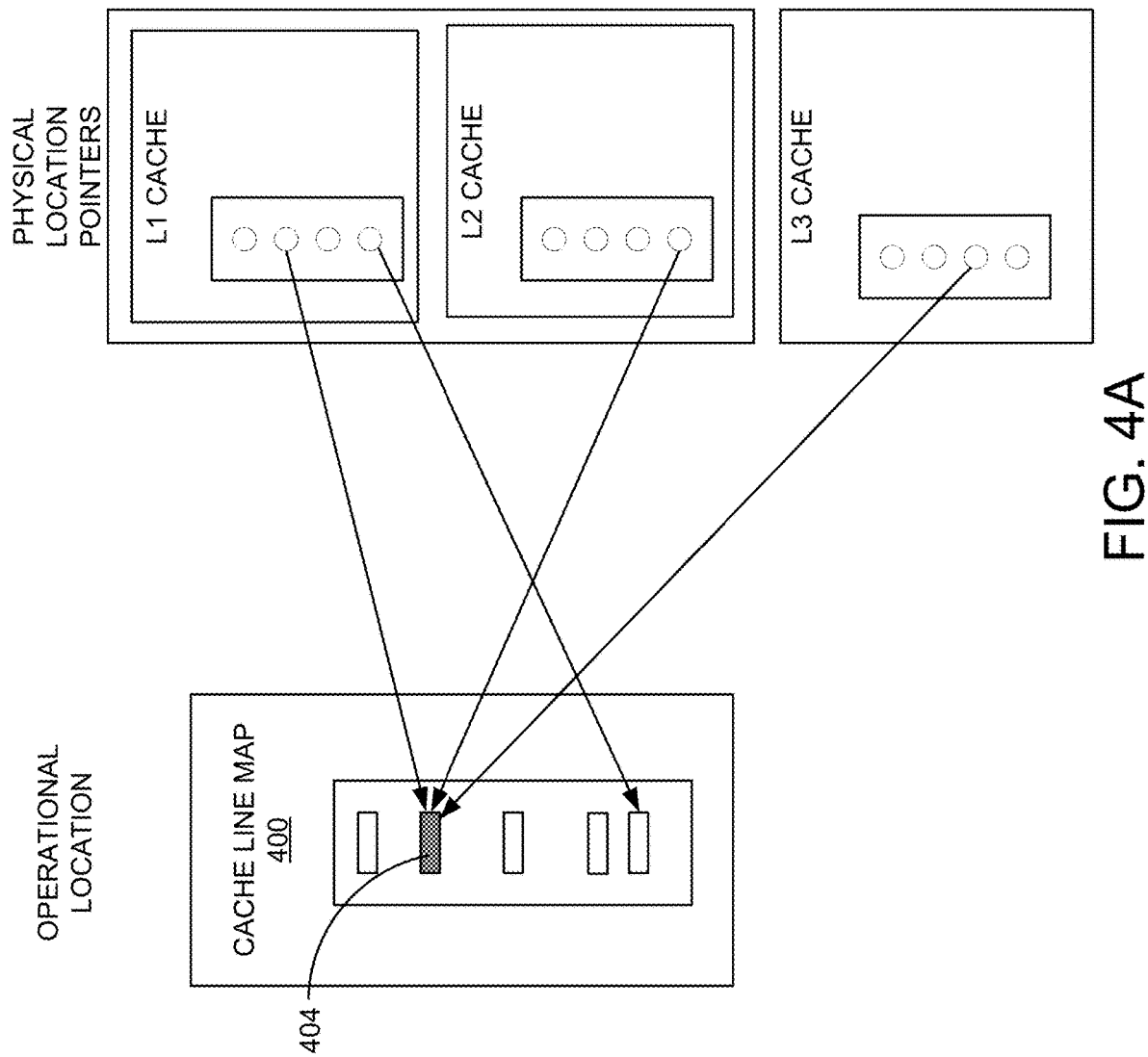
FIG. 4A illustrates an example cache line map representative of a simulated cache hierarchy in accordance with various embodiments.
Figure 4B:
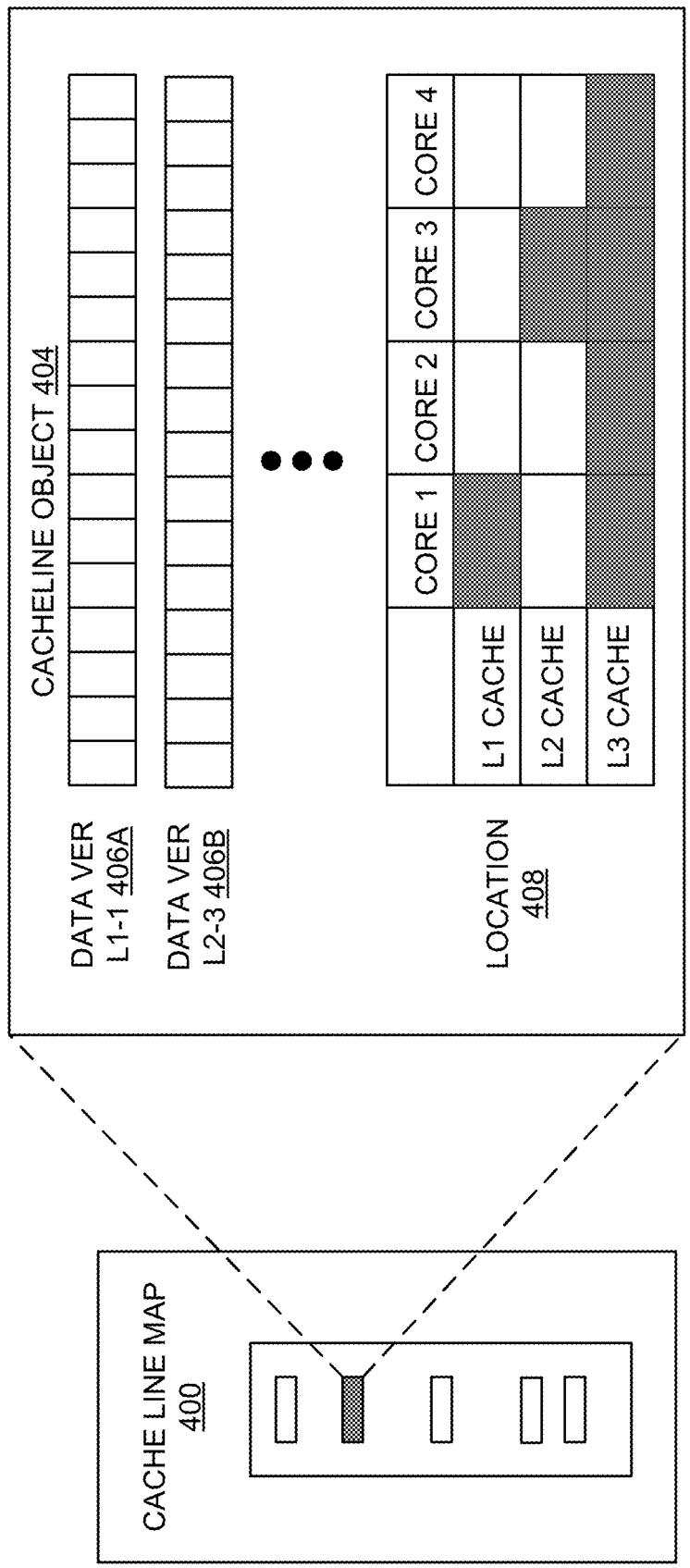
FIG. 4B illustrates an example cache line represented in the cache line map of FIG. 4A.

FIG. 4A illustrates an example cache line map 400 in accordance with one embodiment. The cache line map 400 represents a consolidation of location and state information regarding a particular cache line, an example structure of which is illustrated in FIG. 4B. In this example, a cache line object 404 represented in cache line map 400 can be thought of as a collection of the corresponding data as it may exist at each cache level and/or the same levels across different cores, and a representation (in this example, a hash table) of its location with respect to each core, each cache, and each cache level. This can be referred as an "operational location" of a cache line, i.e., for purposes of running a simulation, the simulator will only need to search cache line map 400 to determine the location/existence of a cache line, e.g., cache line object 404.

The location(s) of cache lines represented by cache line object 404 in accordance with a simulated hardware cache model (e.g., hardware cache model 300 of FIG. 3) can be provided with the use of physical location pointers that reference where cache lines represented by cache line object 404 and copies thereof (if they exist), are stored in the simulated hardware cache. It should be noted that the hierarchy referenced by/using the physical location pointers is similar to the hardware cache model 300. However, the simulation does not actually store cache lines in multiple locations. Rather, all that is stored are references to that locations. That is, one of the physical location pointers may point to a reference of a particular cache level in which data is stored. For example, during execution of a simulation, some data value represented by cache line object 404 may need to be referenced. Accordingly, cache line map 400 may be accessed and searched to determine if the cache line represented by cache line object 404 exists in any cache/cache level of any simulated core. If the cache line represented by cache line object 404 exists, but is not owned by the core that wants to reference it, indexing (i.e., the location data and physical location pointers) can be updated. It should be understood that part of the reason for tracking location data is to keep a simulation consistent with actual storage limitations as designed in hardware. Each level of cache only has so much room for occupancy, so to enable proper cache line evictions from the cache back to main memory, location data should be referenced when moving or adding data into a cache. In this way, proper hardware behavior can be maintained while still modifying the lookup mechanism.

For example, referring back to FIG. 3, consider that core 302B needs to read a cache line that is currently owned by core 302A and held in one of core 302A's cache levels. That cache line can be found simply by referring to cache line map 400. A determination can be made, in this case, that the desired cache line is not held within core 302B's cache hierarchy. Moreover, a determination can be made regarding which cache lines currently held in core 302B's cache hierarchy, i.e., a particular cache level, can be removed. The location of the cache line to be removed can be updated to a new (open) location, thereby making room to write the new, desired cache line. The location(s) of the new, desired cache line/copies thereof can be located by way of the physical location pointers, and a reference to the data (value) stored by the cache line can be inserted into the physical location pointers. As will be described below, the state of the cache line and its copies can be kept coherent as well. On the other hand, if the cache line does not exist in cache line map 400, main memory 304 can be accessed to pull the desired cache line value. In this way, the simulation is not burdened with searching through every core/cache/cache level.

As noted above, states of cache lines can change and/or differ in different locations. Maintaining coherency throughout multiple cores, caches, and cache levels is achieved by virtue of maintaining all location/state information of a particular cache line that exists in cache line map 400. FIG. 4B illustrates a data structure comprising a cache line object 404 of cache line map 400. The data represented by cache line object 404 is maintained in the data structure as well as each and every location where the cache line represented by cache line object 404 (and its copies) are kept in the simulated hardware cache model. The data at each cache level can be represented in cache line object 404 so that different copies that may exist in other caches/cache levels. For example, every value of the data within each cache line and its copies can be indicated (e.g., spread) through a single column, so that different/unique copies of data can exist. In this way, location/state updates can be accomplished, again, simply by referring to cache line map 400. For example, a first version of data 406A within a cache line simulated as being stored in the L1 cache of core 1 can be maintained along with a second version of data 406B within a cache line simulated as determined or allowed by the coherency protocol. It should be understood that the data may be different at each level of the cache hierarchy, and thus, along with each copy of the data may be a tag as to the state (i.e. any of the M, E, S, or I states of MESI) of that data.

Cache line map 400 may be represented as a hash table in accordance with one embodiment. In this embodiment, the hash used can be based on a cache line's address, where a one-to-one correlation exists. That is, a cache line may be associated with a memory address, and that memory address can be used as an index into the hash table. The data structure of a cache line (as illustrated in FIG. 4B) can be stored in this hash table.

A coherency protocol, such as the aforementioned MESI protocol can reflect and maintain a policy regarding how different cache hierarchy owners (which can be cores) operate (in the multi-owner case) and how different cache levels (within that hierarchy (in the single-owner and multi-owner cases) operate. Through such a coherency protocol, respective cache level storage capacities can be considered when reading/writing values from/to cache lines, and how coherency is maintained from a location perspective can again be provided vis-à-vis the physical location pointers to which cache lines of cache line map 400 are mapped.

In some embodiments, the MESI protocol can be used to determine how certain operations will affect the state and location information of a cache line. As alluded to above, the acronym MESI stands for the different states that may occur (Modified, Exclusive, Shared, Invalid). When a modification to data occurs, the protocol determines that ownership of a cache line must be obtained in the coherency domain (all other copies are invalidated, and promote a copy to the exclusive state). Then the data may be written (making the state modified). If the data is read and stored in several caches, it is marked as shared. Knowing this state as shared informs the cache that another core/cache/cache level may have this cache line, so the requesting core should attempt to promote this copy to an exclusive access state (and invalidate any others).

Figure 5:
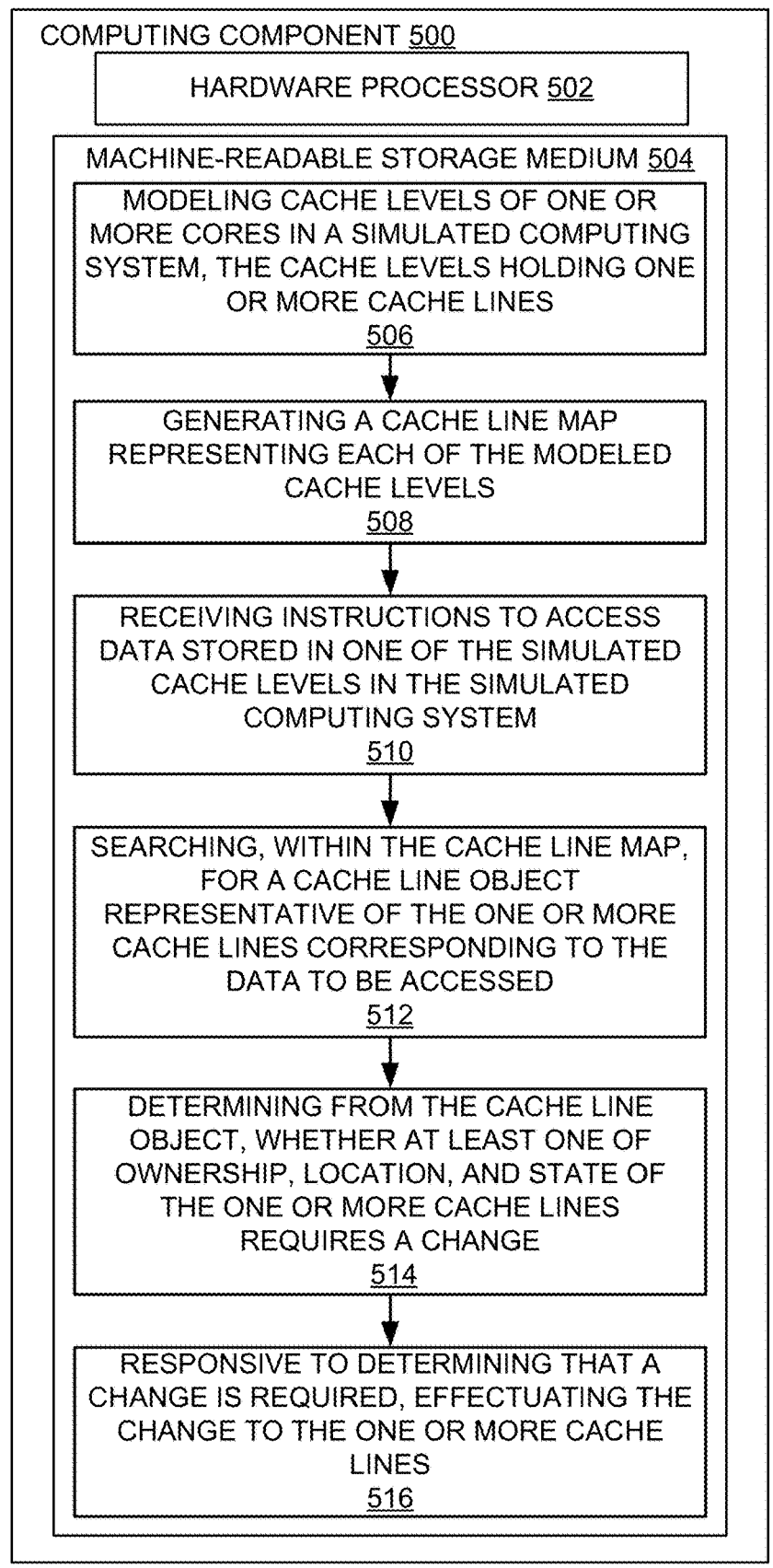
FIG. 5 illustrates an example computing component capable of executing instructions for effectuating multi-core cache simulations in accordance with various embodiments.

FIG. 5 is a block diagram of an example computing component or device 500 for generating and using a flat cache simulation with one embodiment. Computing component 500 may be, for example, a server computer, a controller, or any other similar computing component capable of processing data, such as a modeled CPU core or cache hierarchy driver (as contemplated above). In the example implementation of FIG. 5, computing component 500 includes a hardware processor 502, and machine-readable storage medium 504. In some embodiments, computing component 500 may be an embodiment of a controller, e.g., a component of simulation system 200 of FIG. 2, for example.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-516, to control processes or operations for performing a simulation in accordance with one embodiment. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-516. Machine-readable storage medium 504 may be an embodiment of storage device 208.

Hardware processor 502 may execute instruction 506 to model cache levels of one or more cores in a computing system, the cache levels holding one or more cache lines. Hardware cache model 300 may be an example of such modeled cache levels.

Hardware processor 502 may execute instruction 508 to generate a cache line map representing each of the modeled cache levels. It should be understood, and as noted above, that a single cache line map can be used to represent an entire cache hierarchy across cores. As described above, the cache line map can be represented as a hash table based on memory addresses associated with locations in which cache lines store data values (e.g., stored in a hash table indexed as a function of cache line memory addresses. Cache creation can be performed upon model (e.g., multi-core processor design 212 of FIG. 2) instantiation (or when a system is being created) for simulation. As simulator 220 runs a simulation 224, the system executes, the cache lines are populated into the cache (and inserted into the active mapping of cache lines vis-à-vis physical location pointers). The mapping may be performed using a number of lookup mechanisms, such as an implementation of an ordered list or tree variation. Different lookup algorithms would apply to each data structure. As alluded to above, the result is O(1) complexity using a hash or ordered list structures.

Hardware processor 510 may execute instruction 510 to receive instructions to access data stored in one of the simulated cache levels in the simulated computing system. For example, during a simulation of a multi-core system, a particular core of the simulated multi-core system may wish to access or reference a data value. In response to receiving these instructions, hardware processor 510 may execute instruction 512 to search, within the cache line map, for a cache line of the one or more cache lines corresponding to the data to be accessed. For example, a simulated hardware processor may execute an instruction to flush a cache line, which may force every cache (including any corresponding cache levels and/or cores) to flush that cache line, forcing every core's cache at every level to be searched to evict the line. As another example, a simulated hardware processor may write a data value, which will search the cache. If found, but not owned by the core and cache level for which the search is performed, the cache line may need to be promoted to an exclusive state for that core (flushing out cache lines of other cores), and then written and marked as being in a modified state. Further still, a simulated hardware processor may attempt to prefetch data into the cache, or into a higher level part of the cache, or the simulated hardware processor may choose to flush a cache line to a specific level of shared cached.

Hardware processor 502 may execute instruction 514 to determine from the cache line map, whether at least one of ownership, location, and state of the cache line requires a change. As described above in various embodiments, reading, writing, and referencing data values of cache lines can introduce inconsistencies between different copies of the data in different locations, e.g., cores and/or corresponding cache levels of those cores. In order to maintain coherency, this data can be reflected and made available for reference, by the cache lines housed in the cache line map.

It should be noted that all "ownership" and "state" updating can occur within, and between the caches, such as those associated with cores 212A-212N (FIG. 2). In hardware, messages may be passed around on an interconnect between caches to search or cause state changes for a particular cache line. In simulation, when location information is updated, the physical location pointers are referenced to ensure capacity for new cache lines, and evict old ones if necessary. The location and state information will be updated in other cache lines as appropriate. Then the cache line of interest will either be inserted into both the operational location and the physical location (on addition), or will be copied/moved and have the physical location pointers updated so that the movement of data can be reflected.

Hardware processor 502 may execute instruction 516 to effectuate a change to the cache line in response to determining that a change is required. This can include updating a data value, writing the data value to a different cache line, etc. Moreover, the data value can be returned to the hardware processor 502.

It should be noted that various embodiments described herein are directed to simulated operations of a simulated hardware cache hierarchy. However, it is contemplated that one or more aspects of these various embodiments can be leveraged for use in operating an actual multi-compute-engine system, or any type of storage system/method where speed of processing and maintaining data coherency or maintaining levels of data representation may be needed. The different cache levels are an embodiment of different generations of data, or different levels of the same data that may be used in other variations of data storage. At a high level, various embodiments are able to keep generational data as shadow copies that can be updated according to some protocol, such as a data retention policy.

Figure 6:
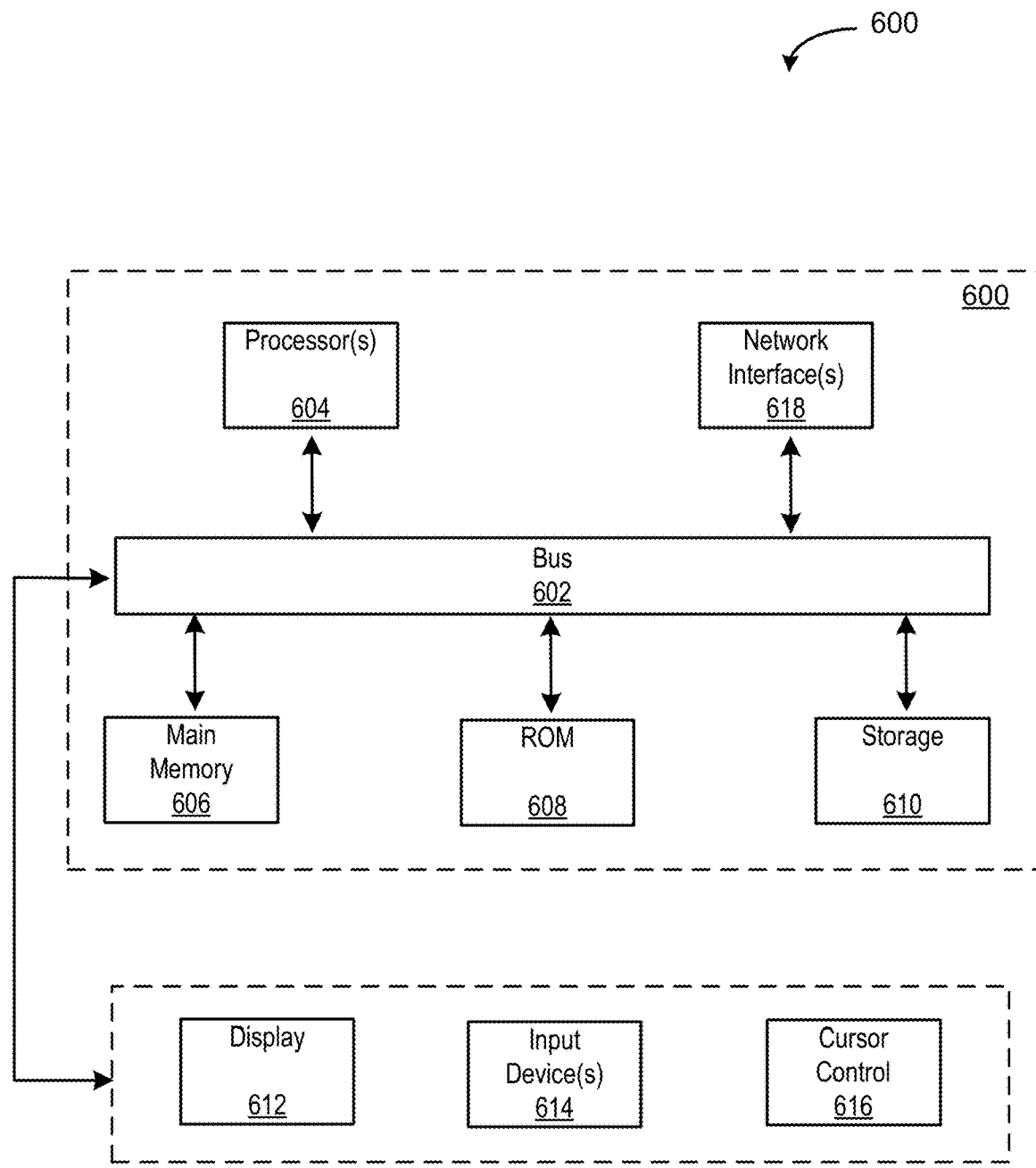
FIG. 6 illustrates an example computing component in which various embodiments described herein may be implemented.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for performing data lookups in a simulated computing system, comprising:
   modeling cache levels of one or more cores in the simulated computing system, the cache levels holding one or more cache lines;
   generating a cache line map representing each of the modeled cache levels, wherein the cache line map comprises operational location information regarding each of the one or more cache lines stored within each of the cache levels of each of the one or more cores;
   receiving instructions to access data stored in one of the simulated cache levels in the simulated computing system;
   searching, within the cache line map, for a cache line object representative of the one or more cache lines corresponding to the data to be accessed, wherein the cache line object representative comprises a representation of one or more locations of each cache line with respect to each core, each cache and each cache level in the simulated computing system;

determining from the cache line map, whether at least one of ownership and state of the one or more cache lines requires a change; and responsive to determining that a change is required, effectuating the change to the one or more cache line.

2. The method of claim 1, wherein the modeling of the cache levels comprises modeling a cache hierarchy of caches associated with each of the one or more cores.

3. The method of claim 2, wherein the cache hierarchy comprises at least one of a level 1 cache, a level 2 cache, and a shared cache.

4. The method of claim 1, wherein the cache line map further comprises state information regarding each of the one or more cache lines stored within each of the cache levels of each of the one or more cores.

5. The method of claim 4, wherein the state information comprises a consolidated collection of the corresponding data as it exists at each cache level.

6. The method of claim 1, wherein the representation comprises a hashed representation.

7. The method of claim 6, wherein the hashed representation corresponds to one or more location pointers indicative of references to where each of the one or more cache lines and copies thereof if existent, are stored in the modeled cache levels of the simulated computing system.

8. The method of claim 1, wherein the search for the cache line within the cache line map is the only search performed unless the cache line does not exist, and responsive to determining that the cache line does not exist in the cache line map, conducting a search of a simulated main memory of the simulated computing system.

9. The method of claim 1, wherein the effectuating of the change comprises updating a value of the data at each of the one or more cache levels and at each of one or more corresponding cores.

10. The method of claim 1, wherein the effectuating of the change comprises at least one of evicting and replacing a value of the data at each of the one or more cache levels and at each of one or more corresponding cores.

11. The method of claim 1, wherein the effectuating of the change comprises moving the data to at least one of a different cache level location and core.

12. A simulation system, comprising:
a processor; and
a memory including a simulator comprising instructions causing the processor to execute a simulation of a processor design, the simulation of the processor design, comprising:
simulating operations of the processor design involving one or more cache levels of one or more cores in the simulated processor design, the cache levels holding one or more cache lines;
receiving instructions to access data stored in the one or more cache lines;
searching, only within a cache line map modeling the one or more cache levels of each of the one or more cores, for a cache line of the one or more cache lines corresponding to the data to be accessed, and accessing the data, wherein the cache line map comprises operational location information that comprises a representation of one or more locations of each cache line stored with respect to each core, each cache, and each cache level in the simulated processor design;
in response to determining that the cache line does not exist in the cache line map, searching for the data in a main memory of the simulated processor design.

13. The simulation system of claim 12, wherein the one or more cache levels comprises a cache hierarchy, the cache hierarchy being replicated in the simulated processor design.

14. The simulation system of claim 13, wherein the cache hierarchy comprises at least one of a level 1 cache, a level 2 cache, and a shared cache.

15. The system of claim 12, wherein the cache line map further comprises and state information regarding each of the one or more cache lines stored within each of the cache levels of each of the one or more cores.

16. The system of claim 15, wherein the state information comprises a consolidated collection of the corresponding data as it exists at each cache level.

17. The system of claim 12, wherein the representation comprises a hashed representation.

18. The system of claim 17, wherein the hashed representation corresponds to one or more location pointers indicative of references to where each of the one or more cache lines and copies thereof if existent, are stored in the modeled cache levels of the simulated processor design.

19. The system of claim 12, wherein the one or more cache levels comprises a cache hierarchy, the cache hierarchy being replicated in the simulated computing system.

20. A non-transitory machine-readable storage medium containing instructions that, when executed by at least one processor, cause a machine to perform actions comprising:
modeling cache levels of one or more cores in a simulated computing system, the cache levels holding one or more cache lines;
generating a cache line map representing each of the modeled cache levels, wherein the cache line map comprises operational location information regarding each of the one or more cache lines stored within each of the cache levels of each of the one or more cores;
receiving instructions to access data stored in one or the simulated cache levels in the simulated computing system;
searching, within the cache line map, for a cache line object representative of the one or more cache lines corresponding to the data to be accessed, wherein the cache line object representative comprises a representation of one or more locations of each cache line with respect to each core, each cache, and each cache level in the simulated processor design; and
updating the one or more cache lines in response to determining, from the cache line map, that as least one of ownership and state of the one or more cache lines requires a change.

* * * * *